(12) United States Patent
Arunachalam

(10) Patent No.: US 11,025,765 B2
(45) Date of Patent: Jun. 1, 2021

(54) WIRELESS AUDIO GUIDE

(71) Applicant: Harman International Industries, Incorporated, Stamford, CT (US)

(72) Inventor: Srinath Arunachalam, Dallas, TX (US)

(73) Assignee: Harman International Industries, Incorporated (STM), Stamford, CT (US)

( * ) Notice: Subject to any disclaimer, the term of this patent is extended or adjusted under 35 U.S.C. 154(b) by 0 days.

(21) Appl. No.: 16/588,703

(22) Filed: Sep. 30, 2019

(65) Prior Publication Data
US 2021/0099563 A1  Apr. 1, 2021

(51) Int. Cl.
| | | |
|---|---|---|
| *H04M 1/60* | (2006.01) | |
| *H04M 1/725* | (2021.01) | |
| *H04M 3/42* | (2006.01) | |
| *H04M 1/72442* | (2021.01) | |
| *H04M 1/72445* | (2021.01) | |

(52) U.S. Cl.
CPC ......... *H04M 1/6066* (2013.01); *H04M 1/605* (2013.01); *H04M 1/72442* (2021.01); *H04M 1/72445* (2021.01); *H04M 3/42348* (2013.01); *H04M 2250/02* (2013.01)

(58) Field of Classification Search
CPC ......... G06F 3/165; G06F 3/167; H04R 1/025; H04R 1/288; H04R 1/345; H04R 29/001; H04R 7/10; H04R 9/025; H04R 9/047; H04W 4/021; H04W 4/023; H04W 4/026

USPC ............. 455/41.1, 41.2, 414.2, 456.3, 456.5, 455/414.1, 557; 709/219
See application file for complete search history.

(56) References Cited

U.S. PATENT DOCUMENTS

| | | | | |
|---|---|---|---|---|
| 9,055,134 | B2* | 6/2015 | Glasser | H04W 4/00 |
| 9,204,251 | B1* | 12/2015 | Mendelson | G07F 17/246 |
| 9,491,584 | B1* | 11/2016 | Mendelson | G01C 21/206 |
| 9,763,046 | B2* | 9/2017 | Eyal | H04W 12/0609 |
| 2002/0016165 | A1* | 2/2002 | Davies | H04H 20/61 |
| | | | | 455/414.1 |
| 2002/0091793 | A1* | 7/2002 | Sagie | H04W 4/024 |
| | | | | 709/217 |
| 2006/0116073 | A1* | 6/2006 | Richenstein | H04H 20/62 |
| | | | | 455/3.06 |
| 2008/0046099 | A1* | 2/2008 | Belmont | H04N 21/482 |
| | | | | 700/11 |
| 2008/0119228 | A1* | 5/2008 | Rao | G06F 16/9577 |
| | | | | 455/557 |
| 2008/0319773 | A1* | 12/2008 | Wong | G06Q 30/02 |
| | | | | 705/348 |
| 2009/0240803 | A1* | 9/2009 | Iwakawa | H04L 65/1069 |
| | | | | 709/224 |
| 2010/0121567 | A1* | 5/2010 | Mendelson | G06Q 30/0239 |
| | | | | 701/467 |
| 2011/0105152 | A1* | 5/2011 | Yu | H04W 4/026 |
| | | | | 455/456.3 |

(Continued)

*Primary Examiner* — Tan H Trinh
(74) *Attorney, Agent, or Firm* — Angela M. Brunetti

(57) ABSTRACT

A wireless audio guide system for an exhibition area. The system includes a BLE chip transmitting a beacon containing audio guide data associated with at least one exhibit in the exhibition area. The beacon is transmitted at predetermined intervals. A mobile device, within a predetermined range of the at least one exhibit, captures the beacon and links the mobile device to an audio file that is played back at the mobile device.

20 Claims, 4 Drawing Sheets

(56) References Cited

U.S. PATENT DOCUMENTS

| | | | |
|---|---|---|---|
| 2012/0042036 A1* | 2/2012 | Lau | H04W 4/60 709/217 |
| 2012/0088524 A1* | 4/2012 | Moldavsky | H04L 51/043 455/456.3 |
| 2013/0217332 A1* | 8/2013 | Altman | H04W 12/04 455/41.2 |
| 2014/0108084 A1* | 4/2014 | Bargetzi | H04L 63/105 705/7.19 |
| 2014/0200893 A1* | 7/2014 | Vanjani | G06F 3/165 704/257 |
| 2014/0277654 A1* | 9/2014 | Reinhardt | G06F 3/165 700/94 |
| 2015/0104152 A1* | 4/2015 | Reinhardt | G06F 3/165 386/243 |
| 2015/0178567 A1* | 6/2015 | Baek | H04W 4/026 455/414.2 |
| 2015/0189476 A1* | 7/2015 | Tanaka | H04W 4/029 455/457 |
| 2015/0195315 A1* | 7/2015 | Kidron | G06F 16/683 709/219 |
| 2016/0077184 A1* | 3/2016 | Steiner | H04W 52/0206 455/456.5 |
| 2017/0026509 A1* | 1/2017 | Rand | H04M 1/72563 |
| 2017/0026794 A1* | 1/2017 | Baker | H04L 5/0048 |
| 2017/0150321 A1* | 5/2017 | Ciecko | H04W 4/026 |
| 2017/0186465 A1* | 6/2017 | Walters | G06F 16/70 |
| 2018/0039430 A1* | 2/2018 | Wong | G06F 16/2372 |
| 2018/0041990 A1* | 2/2018 | Venkatesan | G01S 5/0205 |
| 2018/0091949 A1* | 3/2018 | Steiner | G01S 5/0263 |
| 2018/0150129 A1* | 5/2018 | Thomas | G06F 9/451 |
| 2018/0255426 A1* | 9/2018 | Liao | G06F 3/04883 |
| 2019/0129686 A1* | 5/2019 | Shinotsuka | H04W 4/023 |
| 2019/0279250 A1* | 9/2019 | Gordon | G06F 3/017 |
| 2020/0092670 A1* | 3/2020 | Facchin | G06F 3/165 |
| 2020/0320592 A1* | 10/2020 | Soule | H04W 4/12 |

\* cited by examiner

WIRELESS AUDIO GUIDE

TECHNICAL FIELD

The present disclosure is directed to an audio guide and more particularly to a method for wirelessly transmitting information in an audio guided user experience.

BACKGROUND

Many exhibits at a museum are enhanced by information about each piece in the exhibit that is sometimes not easily included in a small placard that typically accompanies each piece. Further, audio guides, which typically include a headset and a pre-recorded audio track for each piece, have drawbacks in that they may be cumbersome to use and restrict the user to view the exhibits in a fixed order. The audio guided experience typically requires a user to carry around a device that uses a community headset and the user must follow the exhibit in a specific order to match the recorded audio with the piece being observed. Furthermore, the devices themselves have drawbacks that detract from a comfortable user experience, such as poor fitting headsets, poor quality headsets, malfunctioning or broken parts, low battery, and poor volume control to name just a few.

Other audio guides that allow a user to experience the exhibit in a random order require active user interaction with a QR code. Others are user-focused tracking devices that track the location of the user, such as by a GPS transmission, to determine a user's location within the exhibition area. However, GPS is very inefficient for indoor applications.

SUMMARY

A wireless audio guide system for an exhibition area. The system includes a BLE chip transmitting a beacon containing audio guide data associated with at least one exhibit in the exhibition area. The beacon is transmitted at predetermined intervals. A mobile device, within a predetermined range of the at least one exhibit, captures the beacon and links the mobile device to an audio file that is played back at the mobile device.

The mobile device is running a mobile application that has the capability of capturing the beacons being transmitted and each beacon contains a link to audio data that is specific to the exhibit that the mobile device is within range of. The mobile application may include user preference settings for customizing the audio playback at the mobile device.

A method of presenting audio guide data for a plurality of exhibits at a mobile device having Wi-Fi connectivity capability. Each exhibit in the plurality of exhibits has a wireless AP associated therewith. The method determines which exhibit in the plurality of exhibits is in closest proximity to a current location of the mobile device and links the mobile device to an audio file that is played back at the mobile device. The determination of which exhibit is in closest proximity to the mobile device may be made using Fine Timing Measurement, Round Trip Timing and Location Configuration Information according to 802.11 standards.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to an illustrative embodiment, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Any one or more of the servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

Figure 1:
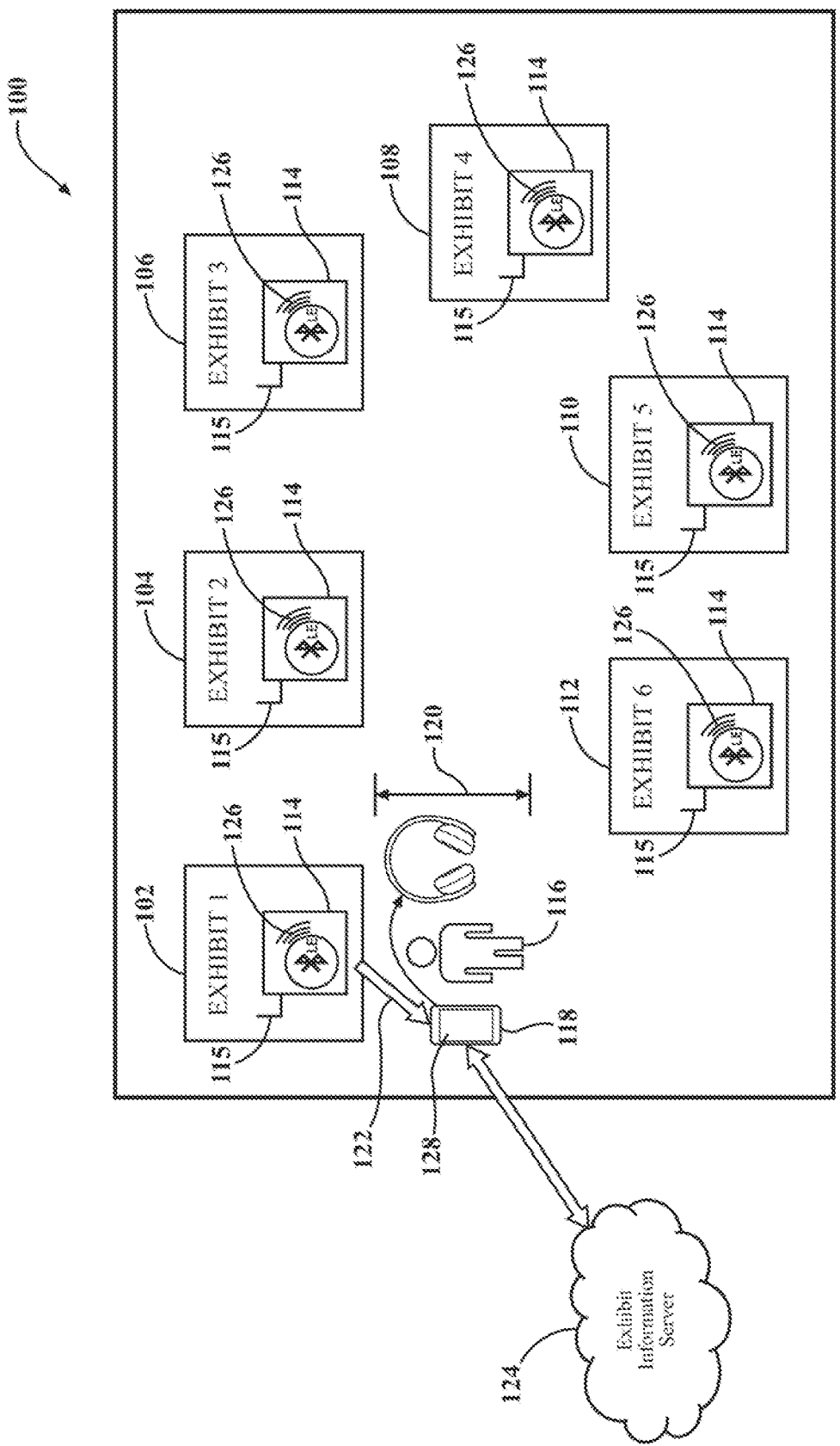
FIG. 1 is a block diagram of an exhibition area having multiple exhibits and a wireless audio guide according to one or more embodiments.

FIG. 1 is a block diagram of an example of an exhibition area 100 with six exhibits 102, 104, 106, 108, 110 and 112. Six exhibits are shown for example purposes only, and in practice, there may be any number of exhibits. Furthermore, the exhibition area 100 may not be limited to one level or one floor. Examples of the exhibition area may include, but are not limited to, a museum, a gallery, a gallery within a museum, a trade show, a convention hall, a retail space, etc. Each exhibit may include, but is not limited to, an item such as a work of art, an object, a document, a booth, a display etc. Each exhibit 102, 104, 106, 108, 110, 112 is equipped with a transmission device 114, such as a Bluetooth Low Energy (BLE) chip or, alternatively, a station (STA) with Wi-Fi capable of connecting to an Access Point (AP), that is part of a Wi-Fi network. A user 116 will navigate throughout the exhibition area 100 with a mobile device 118 such as a smart phone or tablet that is running a mobile application. When the user 116 moves the mobile device 118 within range 120, or in otherwise close proximity to a particular exhibit, the mobile device 118, will receive information 122, such as audio guide data, or a link to an audio file, so that the audio file may be played back at the mobile device for the user to listen to information associated with that particular exhibit. The audio files to be played back according to the audio guide data may be stored at the mobile device 118. Alternatively, the audio files may be stored at a local server, a remote server, or a cloud-based server, 124 and may be transmitted or otherwise communicated, for example over a Wi-Fi network or another vehicle with Internet accessibility, to the mobile device 118 for playback.

In one or more embodiments shown in FIG. 1, the transmission device 114 at each exhibit may be a Bluetooth Low Energy (BLE) chip. The BLE chip, for example, may be incorporated into a placard that is placed at each exhibit. The BLE chip sends a transmission 126, such as a beacon, at predetermined intervals. The transmission 126 may contain a link or an Internet address to audio data associated with the exhibits. The user 116 is equipped with the mobile device 118, such as a smart phone, that has a Bluetooth Low Energy (BLE) application 128 downloaded on the device. BLE is a variant of Bluetooth that consumes a lot less energy. Small amounts of data may be transmitted between the BLE chip and nearby devices. When the user 116 is within receiving range 120 of the BLE beacon 126 being transmitted from the exhibit being observed, the BLE app 128 on the mobile device 118 reads the beacon 114 being transmitted and links 122 the mobile device 118 to a server 124 to access audio associated with the particular exhibit under observation. The link 122 may or may or may not require Internet service in the exhibition area 100 depending on the location of the server.

Alternatively, if there is no Internet available, the application 128 downloaded to the mobile device 118 may also include the audio files making them available on the device whereby, the BLE beacon transmissions 126 transmitted from the BLE chip 114 associated with the exhibit under observation will link the audio file associated with the exhibit under observation to be played back at the mobile device 118 from downloaded audio data stored on the mobile device 118.

The mobile device 118 may be the user's 116 own personal smart phone or tablet or, alternatively, it may be a mobile device 118 that is supplied by the exhibition operator or museum curator. The user 116 may use their own mobile device 118 with their preferred settings and their own headphones or headset. This eliminates the need for a user to carry multiple devices, use community headsets, and deal with any inconveniences of standard audio guide devices.

The proximity of the mobile device 118 must be within the predetermined range 120 so that BLE beacon transmissions occurring at regular intervals may be capture by the application 128 running on the mobile device. This system and method will allow the user to move freely about the exhibition area and observe the exhibits in any order they desire. The user can listen to the audio on the device of his choice using their own personal headset or headphones. Because most people are already equipped with a smart phone, they are not burdened with having to carry around an additional audio guide device and use borrowed community headsets. Furthermore, a location of the user does not need to be known or tracked. The mobile device 118 should be within the predetermined range 120 of the transmission to receive the BLE beacon transmission.

In one or more embodiments, the BLE chip 114 includes a directional antenna 115 to direct the transmission as desired within a predefined area or range 120 of the exhibits within the exhibition area. The BLE chip 114 may also be programmed so that the transmission has a has a signal strength that accommodates a desired range and direction of the transmission. The arrangement of the exhibition area will dictate the range and directivity of the BLE chip beacon for each exhibit. For exhibits 102-112 that may be spaced close together in the exhibition area 100, the signal strength and directivity of the BLE beacon 114 may be controlled as directed by the BLE antenna 115 so that the signal strength is at a level that limits it to a predetermined range and so that it is transmitted in a predetermined direction, for example straight in front of the exhibit. Such directional transmission is made for the purpose of preventing overlap of audio guide data that might occur if the exhibits are spaced close together. The intent is to simplify the user experience so that there is minimum input or effort that needs to be made by the user to view the exhibits and follow along with the audio guide.

Figure 2:
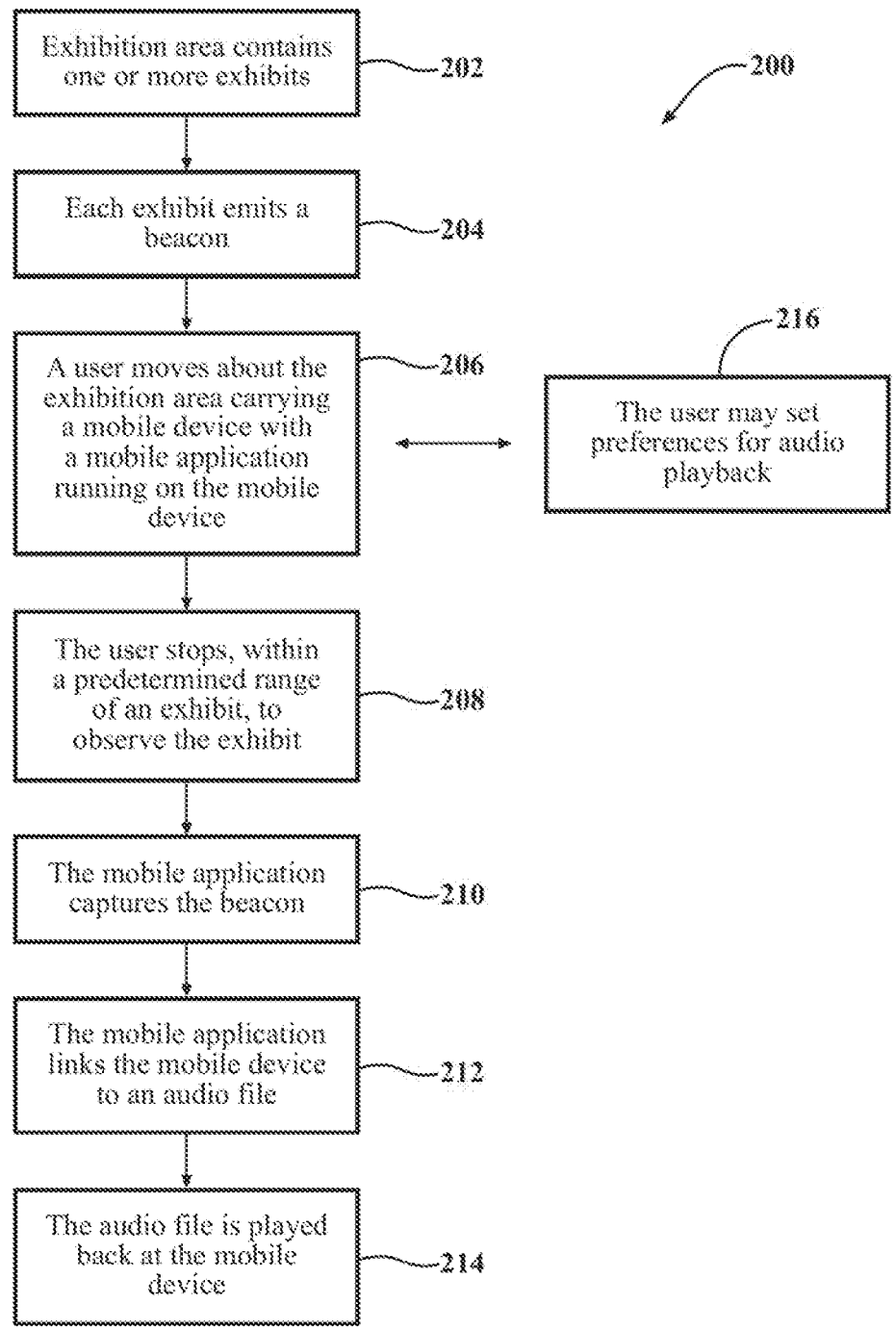
FIG. 2 is a flow chart of a method for a wireless audio guide according to one or more embodiments.

In the method 200 shown in FIG. 2, the exhibition area has one or more exhibits on display 202. Each exhibit in the exhibition area has a BLE chip associated with it that transmits 204 a beacon at predetermined intervals. Each beacon transmitted contains data, such as an address or link to an audio file that may be played back at a mobile device. The link may be an address to a file on a remote server which would require Internet access over a Wi-Fi, or similar, connection. Alternatively, the link may be to a file that has been downloaded and stored on the mobile device, for example if all the audio files associated with each exhibit are installed on the mobile device.

The mobile device has an application for capturing the beacon transmissions, so that as a user carrying the mobile device moves 206 throughout the exhibition area in no order or pattern. The user stops 208 to observe an exhibit within a predetermined range of the exhibit under observation. The mobile application running on the mobile device captures 210 the beacon and links 212 the mobile device to an audio file that is specific to the exhibit under observation. The audio file is played back 214 at the mobile device.

The application may have customization features that allow the user to set preferences 216. For example, the user may, by way of the mobile application, set their preferred settings for language, volume, one or more equalizer settings, etc.

Figure 3:
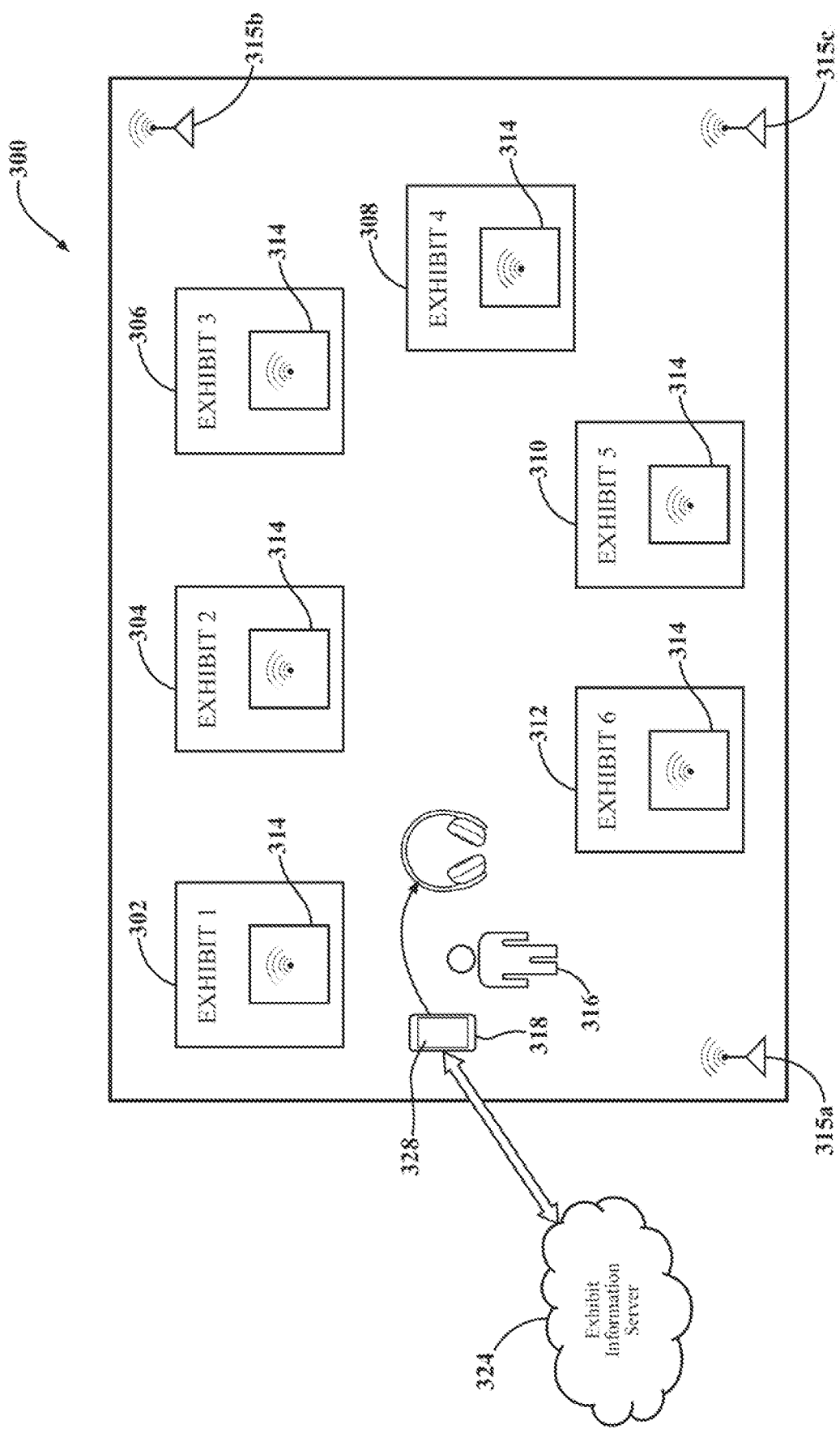
FIG. 3 is a block diagram of an exhibition area having multiple exhibits and a wireless audio guide according to one or more embodiments.

In one or more embodiments shown in FIG. 3, the exhibition area 300 is equipped with Wi-Fi capability having at least two Access Points (AP) 315a, 315b. A third AP 315c may also be used to further refine location services within the exhibition area 300. The AP's 315a, 315b and 315c each have known locations within the exhibition area. Each exhibit 302, 304, 306, 308, 310, 312 also has known locations within the exhibition area and relative to the APs. Each exhibit 302, 304, 306, 308, 310, 312 may also be capable of connecting to the Wi-Fi network. With Wi-Fi connected exhibits, the exact location of each exhibit may be determined at any time.

A mobile device 318 is also a station (STA) by way of its Wi-Fi capability. However, the specific location, i.e., exact known coordinates, of the mobile device 318 changes frequently as a user 316 moves about the exhibition area 300. While it is not necessary to constantly track or monitor the location of the mobile device, it is possible to triangulate its location at any time. For example, the location may be triangulated at a predetermined time interval or under predetermined operating conditions associated with the mobile device 318, such as sensing the mobile device 318 is not moving. For example, if the mobile device 318 remains stationary for a predetermined time period, the steps to triangulate its location in order to present audio guide data that is associated with the exhibit 302 in the closest proximity to the mobile device 318 may be initiated.

Fine Timing Measurement (FTM) may be used to accurately calculate a distance between two stations using a round trip time (RTT) between two stations. A first RTT between the first AP 315*a* and the mobile device may be used to calculate the distance between them. A second RTT between the second AP 315*b* and the mobile device 318 may be used to calculate the distance between them. Knowing the distance between the first and second AP's 315*a*, 315*b*, makes it possible to triangulate a location of the mobile device 318 relative to each of the AP's and therefore, relative to each exhibit.

A comparison of the location of each exhibit 302-312, of which each is known, to the location of the mobile device 318 will determine which exhibit 302 is in closest proximity to the mobile device 318. Upon which determination, audio guide data about the exhibit 302 in closest proximity to the mobile device 318 may be sent from the server 324 to the mobile device 318.

In one or more embodiments, the third AP 315*c* having a known location may be used to also determine an exact location of the mobile device 318 that also includes a height. This feature may be useful for an exhibition area having multiple floors or levels of display. Again, FTM, RTT according to 802.11 standards may be used.

A potential problem exists when a user 316 is moving and therefore regularly passing by multiple exhibits that may be closest to the mobile device 318 but only for a very short period. In this situation, it is possible for the application running on the mobile device to present a choice to the user and the user may select the exhibit they are interested in. Alternatively, triangulation of the location associated with the mobile device may be taking place regularly and sending audio guide data to the mobile device 318 is initiated only after the mobile device is stationary within the exhibit area 300 or remains stationary for a predetermined period.

Another potential problem exists when a user 316 is equidistant from each of the first and second exhibits. In this situation, the mobile application may be configured to present the user with an option to select a desired exhibit for which to receive the audio file.

Figure 4:
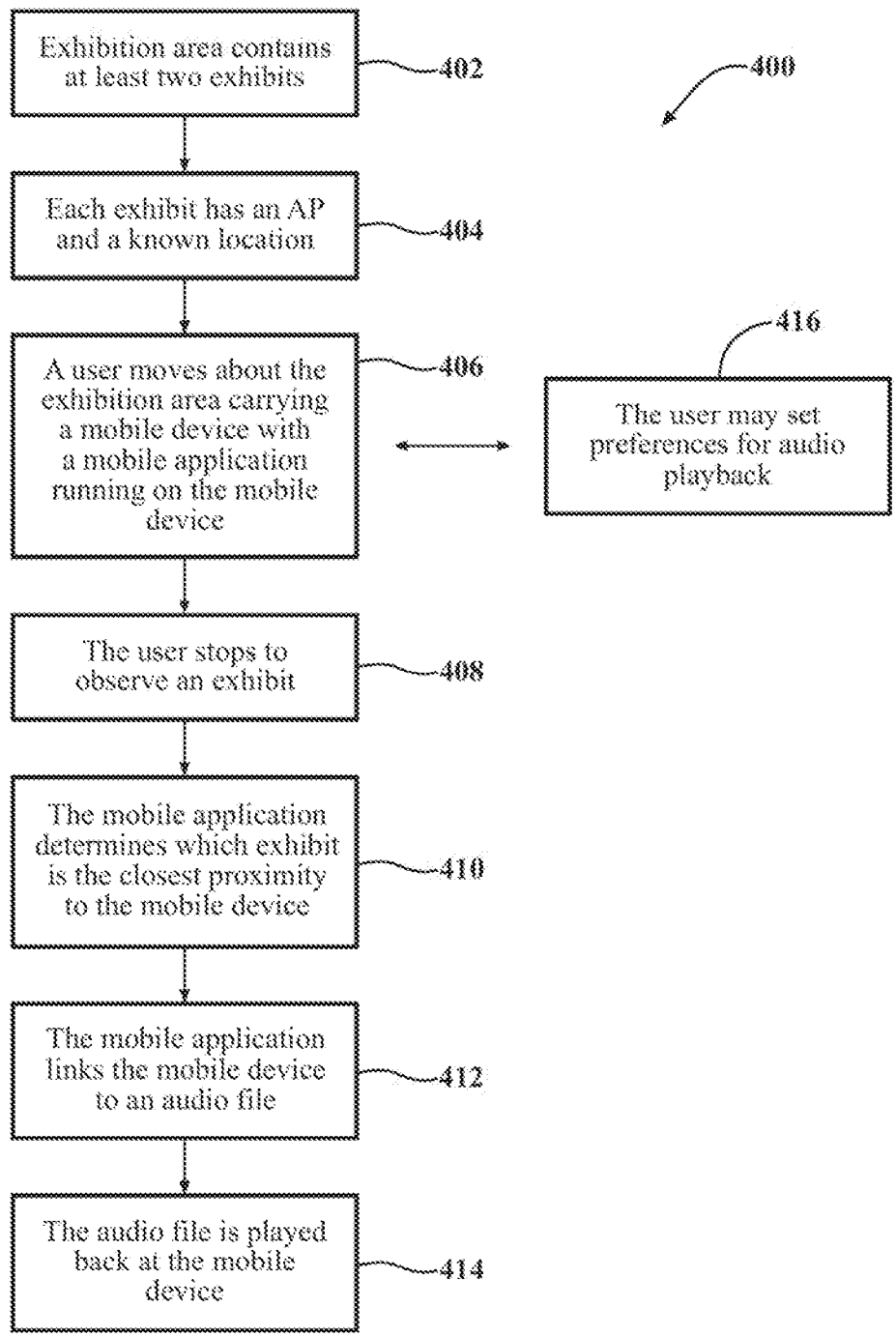
FIG. 4 is a flow chart of a method for a wireless audio guide according to one or more embodiments.

In the method 400 shown in FIG. 4, the exhibition area has one or more exhibits on display 402 and each exhibit has a known location 404 with respect to each AP in the exhibition area. A user carrying a mobile device moves 406 throughout the exhibition area in no order. The user stops 408 to observe a first exhibit. A second exhibit may also be nearby. The mobile application determines 410 which of the exhibits is closest to the mobile device. An audio file that is specific to the exhibit closest to the mobile device is sent 412 from a server and played back 414 at the mobile device.

The application may have customization features that allow the user to set preferences 416. For example, the user may, by way of the mobile application, set their preferred settings for language, volume, one or more equalizer settings, etc.

The determination 410 as to which of the exhibits is closest to the mobile device may be accomplished as described above with reference to FIG. 3 using FTM and LCI, which are part of the IEEE 802.11 standard. It is also possible to perform pre-association negotiations between the mobile device and each exhibit AP to decide how FTM is to be carried out.

In the foregoing specification, the present disclosure has been described with reference to specific exemplary embodiments. Various modifications and changes may be made, however, without departing from the scope of the present disclosure as set forth in the claims. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and may not be limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

The invention claimed is:

1. A method of presenting audio guide data for a plurality of exhibits, the method carried out on a device having a processing unit including a non-transitory computer-readable storage medium configured to execute instructions of a software program, the method comprising:
    wirelessly transmitting audio guide data from each exhibit in the plurality of exhibits;
    running a mobile application on a mobile device, the mobile application is configured to capture audio guide data being wirelessly transmitted from each exhibit;
    capturing the audio guide data transmission for one of the exhibits in the plurality of exhibits when the mobile device running the mobile application is within a predetermined range of the exhibit;
    linking the mobile device, by way of the mobile application and the captured audio guide data transmission, to an audio file that is specific to the exhibit of which the mobile device is within the predetermined range;
    playing the audio file at the mobile device.

2. The method of claim 1, further comprising setting user preferences in the mobile application for playing back the audio guide data at the mobile device.

3. The method of claim 2, wherein setting user preferences further comprises setting one or more settings from the group consisting of setting a language preference, and setting a volume preference, setting one or more equalizer settings.

4. The method of claim 1, wherein the mobile device has Internet accessibility and the step of linking the mobile device to an audio file further comprises accessing the audio file over the Internet.

5. The method of claim 1, wherein the step of linking the mobile device to an audio file further comprises the steps of:
   downloading audio files for each exhibit in the plurality of exhibits onto the mobile device; and
   linking the mobile device to the downloaded audio file that is specific to the exhibit of which the mobile device is within the predetermined range.

6. The method of claim 1, wherein the mobile application running on the mobile device has Bluetooth Low Energy packet capturing capability, each exhibit in the one or more exhibits has a BLE chip, and the step of wirelessly transmitting audio guide data further comprises the BLE chip transmitting a beacon at predetermined time intervals, the beacon contains an address for the audio file associated with each exhibit.

7. The method of claim 6, wherein the beacon being transmitted from each exhibit is being transmitted with a predetermined signal strength and in a predetermined direction.

8. The method of claim 7, further comprising the step of determining a signal strength and directivity of the beacon based on a location of each exhibit and a relative location of each exhibit to each of the other exhibits in the plurality of exhibits.

9. A wireless audio guide system for one or more exhibits, comprising:
   a BLE chip located at each exhibit and transmitting a beacon containing audio guide data, the beacon has a predetermined signal strength and is transmitted at predetermined time intervals;
   a mobile device running an application that captures the beacon from each exhibit when the mobile device is within a predetermined range of each exhibit;
   an audio file accessed using the audio guide data for each exhibit captured in the transmitted beacon and played back at the mobile device.

10. The system of claim 9, further comprising, a server accessible by the mobile device wherein the audio file accessed using the audio guide data captured by the mobile is accessed by way of an address contained in the audio guide data.

11. The system of claim 10, wherein the server is a cloud-based server.

12. The system of claim 9, wherein the BLE chip further comprises a directional antenna that causes the beacon to be transmitted in a predetermined direction.

13. The system of claim 12, wherein the predetermined signal strength and the predetermined direction of the beacon are based on a location of the each exhibit.

14. The system of claim 9, wherein the application running on the mobile device further comprises user preference settings set by a user of the application.

15. The system of claim 14, wherein the user preference settings include one or more of a language preference setting, a volume preference setting, or one or more equalizer preference settings.

16. A method of presenting audio guide data for a plurality of exhibits at a mobile device having Wi-Fi connectivity capability, the method is carried out on a device having a processing unit including a non-transitory computer-readable storage medium configured to execute instructions of a software program, the method comprising the steps of:
   determining which exhibit in the plurality of exhibits is in closest proximity to a current location of the mobile device;
   linking the mobile device to audio guide data that is associated with the exhibit determined to be in closest proximity to the current location of the mobile device; and
   playing back the audio guide data at the mobile device.

17. The method of claim 16, further comprising the step of determining that the mobile device is not moving and after determining that the mobile device is not moving, determining which exhibit is in closest proximity to the mobile device and linking the mobile device to audio guide data that is associated with the exhibit determined to be in closest proximity to the current location of the mobile device.

18. The method of claim 17, wherein the step of determining that the mobile device is not moving further comprises detecting that the mobile device has not moved for a predetermined period.

19. The method of claim 16, wherein the step of determining which exhibit is in closest proximity to a current location of the mobile device is implemented using Fine Timing Measurement (FTM) according to 802.11 standards and further comprises the steps of:
   determining a first round trip time (RTT) between a first access point having a known location and the mobile device;
   determining a second RTT between a second access point having a known location and the mobile device;
   triangulating a location of the mobile device using the first RTT and the second RTT; and
   comparing the location of the mobile device with a location of each exhibit to determine which exhibit is in closest proximity to the mobile device.

20. The method of claim 16, wherein the step of determining which exhibit is in closest proximity to a current location of the mobile device is implemented using Fine Timing Measurement (FTM) and Location Configuration Information (LCI) to accept and deliver location-based requests according to 802.11 standards.

* * * * *